(12) United States Patent
Moyer et al.

(10) Patent No.: US 7,401,201 B2
(45) Date of Patent: Jul. 15, 2008

(54) PROCESSOR AND METHOD FOR ALTERING ADDRESS TRANSLATION

(75) Inventors: William C. Moyer, Dripping Springs, TX (US); Ray C. Marshall, Abbots Langley (GB); Richard Soja, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 218 days.

(21) Appl. No.: 11/413,422

(22) Filed: Apr. 28, 2006

(65) Prior Publication Data

US 2007/0255924 A1 Nov. 1, 2007

(51) Int. Cl.
*G06F 12/00* (2006.01)

(52) U.S. Cl. ...................................... 711/207

(58) Field of Classification Search ........................ None
See application file for complete search history.

(56) References Cited

U.S. PATENT DOCUMENTS

| | | | |
|---|---|---|---|
| 4,488,228 A | 12/1984 | Crudele et al. | |
| 4,493,035 A | 1/1985 | MacGregor et al. | |
| 4,524,415 A | 6/1985 | Mills, Jr. et al. | |
| 4,635,193 A | 1/1987 | Moyer et al. | |
| 4,763,244 A | 8/1988 | Moyer et al. | |
| 4,763,250 A | 8/1988 | Keshlear et al. | |
| 4,800,489 A | 1/1989 | Moyer et al. | |
| 4,862,352 A | 8/1989 | Moyer et al. | |
| 4,888,688 A | 12/1989 | Hartvigsen et al. | |
| 4,890,223 A | 12/1989 | Cruess et al. | |
| 5,029,072 A | 7/1991 | Moyer et al. | |
| 5,239,642 A | 8/1993 | Gutierrez et al. | |
| 5,319,763 A | 6/1994 | Ho et al. | |
| 5,341,500 A | 8/1994 | Moyer et al. | |
| 5,375,216 A | 12/1994 | Moyer et al. | |
| 5,388,226 A | 2/1995 | Gutierrez et al. | |
| 5,535,351 A | 7/1996 | Peng | |
| 5,666,509 A | 9/1997 | McCarthy et al. | |
| 5,732,405 A | 3/1998 | Ho et al. | |
| 6,154,826 A | 11/2000 | Wulf et al. | |
| 6,185,657 B1 | 2/2001 | Moyer | |
| 6,519,684 B1 | 2/2003 | Moyer | |
| 6,523,104 B2 * | 2/2003 | Kissell | 711/206 |
| 6,643,759 B2 * | 11/2003 | Andersson et al. | 711/207 |
| 6,651,156 B1 * | 11/2003 | Courtright et al. | 711/207 |
| 6,725,289 B1 | 4/2004 | Waldspurger et al. | |
| 6,728,859 B1 * | 4/2004 | Kissell | 711/206 |

(Continued)

*Primary Examiner*—Kevin Verbrugge
(74) *Attorney, Agent, or Firm*—Robert L. King; Joanna G. Chiu

(57) ABSTRACT

In a processor having an address translation table, a method includes providing a logical address and control signal. When the control signal has a first value, a first physical address is provided corresponding to the logical address, and when the control signal has a second value, a second physical address is provided. The first physical address and the second physical address are stored in at least one valid entry of the address translation table. In one case, the first physical address is stored in a first valid entry having a tag field which matches the logical address and the second physical address is stored in a second valid entry having a tag field which matches the logical address. Alternatively, the first physical address is stored in a first field of a first valid entry and the second physical address is stored in a second field of the first valid entry.

16 Claims, 3 Drawing Sheets

U.S. PATENT DOCUMENTS

| | | | |
|---|---|---|---|
| 6,748,558 B1 | 6/2004 | Gonzales et al. | |
| 6,766,431 B1 | 7/2004 | Moyer | |
| 6,859,875 B1 | 2/2005 | Moyer et al. | |
| 6,925,542 B2 | 8/2005 | Moyer et al. | |
| 6,963,963 B2 | 11/2005 | Moyer | |
| 7,024,536 B2* | 4/2006 | Park et al. | 711/206 |
| 7,093,100 B2* | 8/2006 | Bridges et al. | 711/207 |
| 7,299,266 B2* | 11/2007 | Boyd et al. | 709/213 |
| 2002/0144077 A1* | 10/2002 | Andersson et al. | 711/203 |
| 2003/0014609 A1* | 1/2003 | Kissell | 711/206 |
| 2003/0182532 A1* | 9/2003 | Park et al. | 711/207 |
| 2004/0049600 A1* | 3/2004 | Boyd et al. | 709/250 |
| 2004/0186973 A1 | 9/2004 | Moyer et al. | |
| 2004/0193831 A1 | 9/2004 | Moyer | |
| 2005/0038973 A1 | 2/2005 | Ito et al. | |
| 2005/0108497 A1* | 5/2005 | Bridges et al. | 711/207 |
| 2005/0125623 A1 | 6/2005 | Dale et al. | |
| 2005/0273572 A1* | 12/2005 | Takahashi et al. | 711/203 |
| 2007/0198805 A1* | 8/2007 | Soja et al. | 711/202 |
| 2007/0250666 A1* | 10/2007 | Sartorius et al. | 711/133 |

* cited by examiner

PROCESSOR AND METHOD FOR ALTERING ADDRESS TRANSLATION

RELATED APPLICATIONS

The present invention relates to the following co-pending applications:
(1) "Data Processing System Having Address Translation Bypass And Method Therefor" which was filed on Feb. 23, 2006 and has a serial number of 11/360,926 and assigned to the assignee of the present application; and
(2) "Non-Intrusive Address Mapping Having A Modified Address Space Identifier and Circuitry Therefor" which was filed of even date herewith by Richard Soja et al., U.S. Ser. No. 11/413,430 and assigned to the assignee of the present application.

FIELD OF THE INVENTION

The present invention relates generally to data processors, and more particularly to address translation performed by data processors.

BACKGROUND OF THE INVENTION

Data processing systems frequency include a variety of types of memories, some of which may have different timing specifications. If the data processing system is used in a real-time application system, it may be useful during development to temporarily overlay small blocks of readily programmed memory, such as SRAM (Static Random Access Memory) over a portion of more difficult to program memory such as flash EEPROM (electrically erasable programmable read only memory) or ROM (read only memory) in order to allow the values obtained form the memory to be temporarily changed more readily. Additionally, in control systems a calibration process is commonly implemented prior to final production in which there is a remapping of pages of memory that contain different control parameters for purposes of fine tuning final production control parameters. For example, to fine tune or calibrate the behavior of an application, a set of program constant that application code is accessing may have to be modified by a user using an external tool connected to the processing system. The set of program constants must be made available coherently to the application code, and usually at some specific location in the execution of the code.

For development purposes address translation information is therefore required to be altered for one or more pages of memory by an external agent, such as a software or hardware development tool. Because a memory management unit (MMU) in a processing system can only be manipulated by an associated processor, the altering of address translation information may require the halting of the processor's execution to permit address translation alteration by a debug or scan port. Alternatively, the processor may be interrupted to permit software to remap the addressing. The remapping of memory is typically an intrusive operation that negatively effects system operation.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
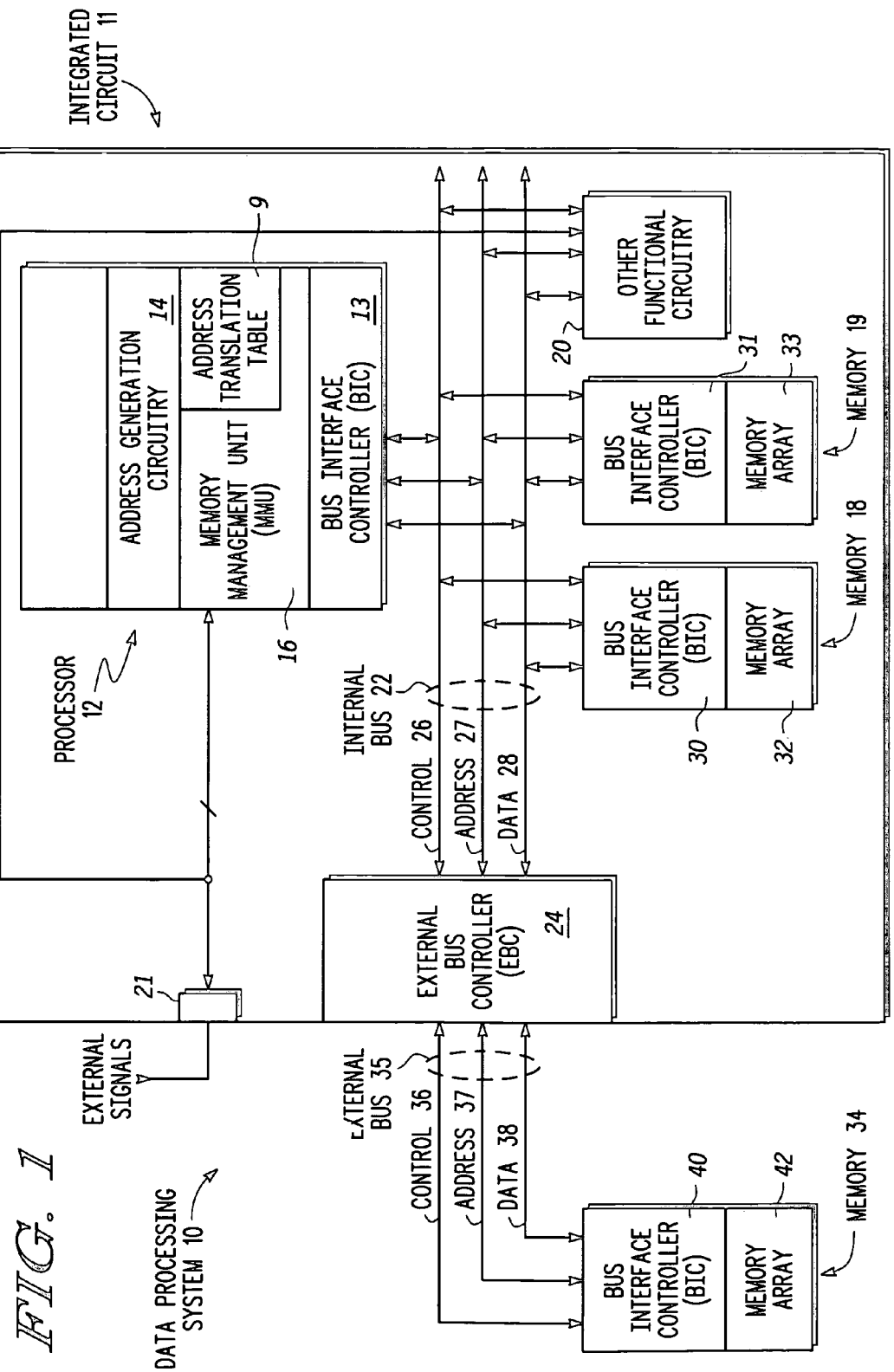
FIG. 1 illustrates a block diagram of a data processing system in accordance with one embodiment of the present invention.

Referring to FIG. 1, in one embodiment, a data processing system 10 includes an integrated circuit 11 having a processor 12, a memory 18, a memory 19, other functional circuitry 20, and external bus controller (EBC) 24 which are bi-directionally coupled by way of an internal bus 22. The internal bus 22 includes control signals 26, address signals 27, and data signals 28. The processor 12 includes a bus interface controller (BIC) 13 which bi-directionally couples the processor 12 to control signals 26, address signals 27, and data signals 28. The memory 18 includes a memory array 32 and a bus interface controller (BIC) 30. The BIC 30 bi-directionally couples the memory 18 to control signals 26, address signals 27, and data signals 28. Memory 19 includes a memory array 33 and a bus interface controller (BIC) 31. BIC 31 bi-directionally couples the memory 19 to control signals 26, address signals 27, and data signals 28. Other functional circuitry 20 is bi-directionally coupled to control signals 26, address signals 27, and data signals 28. An external bus controller (EBC) 24 is bi-directionally coupled to control signals 26, address signals 27, and data signals 28. Note that in different embodiments of the present invention, processor 12, memory 18, memory 19, other functional circuitry 20, and EBC 24 may be coupled to any desired portions of the internal bus 22 which allow these blocks to perform their respective functions. Thus in some embodiments, not all of the elements associated with reference numbers 12, 18-20, and 24 need be coupled to all of the signals of the internal bus 22. Note also that for some embodiments of the present invention, at least a portion of control signals 26 and 36 may be used to transfer status information. External signals are supplied to an integrated circuit pin 21 of the integrated circuit 11. A conductive bus is connected between the integrated circuit pin 21 and an input of the memory management unit 16. Also, a bidirectional bus is connected between the integrated circuit pin 21 and an input/output terminal of the other functional circuitry 20.

The processor 12 includes address generation circuitry 14. Some embodiments of the processor 12 may include a memory management unit 16. The memory management unit 16 may include address translation table 9. However, the memory management unit 16 and address translation table 9 may be located anywhere appropriate in data processing system 10. Other functional circuitry 20 may perform any desired function. Some examples of functions which may be performed by other functional circuitry 20 are timers, an input/output port, a communications port (e.g. a serial communications port, a serial peripheral interface, etc.), drivers (e.g. Liquid Crystal Display drivers), an analog-to-digital (A/D) converter, a digital-to-analog (D/A) converter, additional memory, a Direct Memory Access (DMA) device, or any other desired function.

The external bus controller (EBC) 24 is used to bi-directionally couple the internal bus 22 and the external bus 35. The integrated circuit 11 is bi-directionally coupled to the memory 34 by way of an external bus 35. The external bus 35 includes control signals 36, address signals 37, and data signal 38. The memory 34 includes a memory array 42 and a bus interface controller (BIC) 40. The BIC 40 bi-directionally couples the memory 34 to the control signals 36, the address signals 37 and the data signals 38. In alternate embodiments, the memory 34 and the integrated circuit 11 are implemented on different integrated circuits. In yet other embodiments, various portions of the data processing system 10 are implemented on different integrated circuits or the same integrated circuit.

Although the data processing system 10 has been illustrated as having memories 18, 19, and 34, alternate embodiments may have any desired number of memories implemented on the integrated circuit 11 (e.g. memories 18 and 19) and any desired number of memories implemented external to the integrated circuit 11 (e.g. memory 34). In addition, the memory 18, the memory 19 and the memory 34 may be any type of memory: including, but not limited to static random access memory (SRAM), dynamic random access memory (DRAM), read only memory (ROM), erasable programmable read only memory (EPROM), electrically erasable programmable read only memory (EEPROM), magnetic random access memory (MRAM), etc. Note that memories 18, 19, and 34 may be the same, or different, types of memories.

Figure 2:
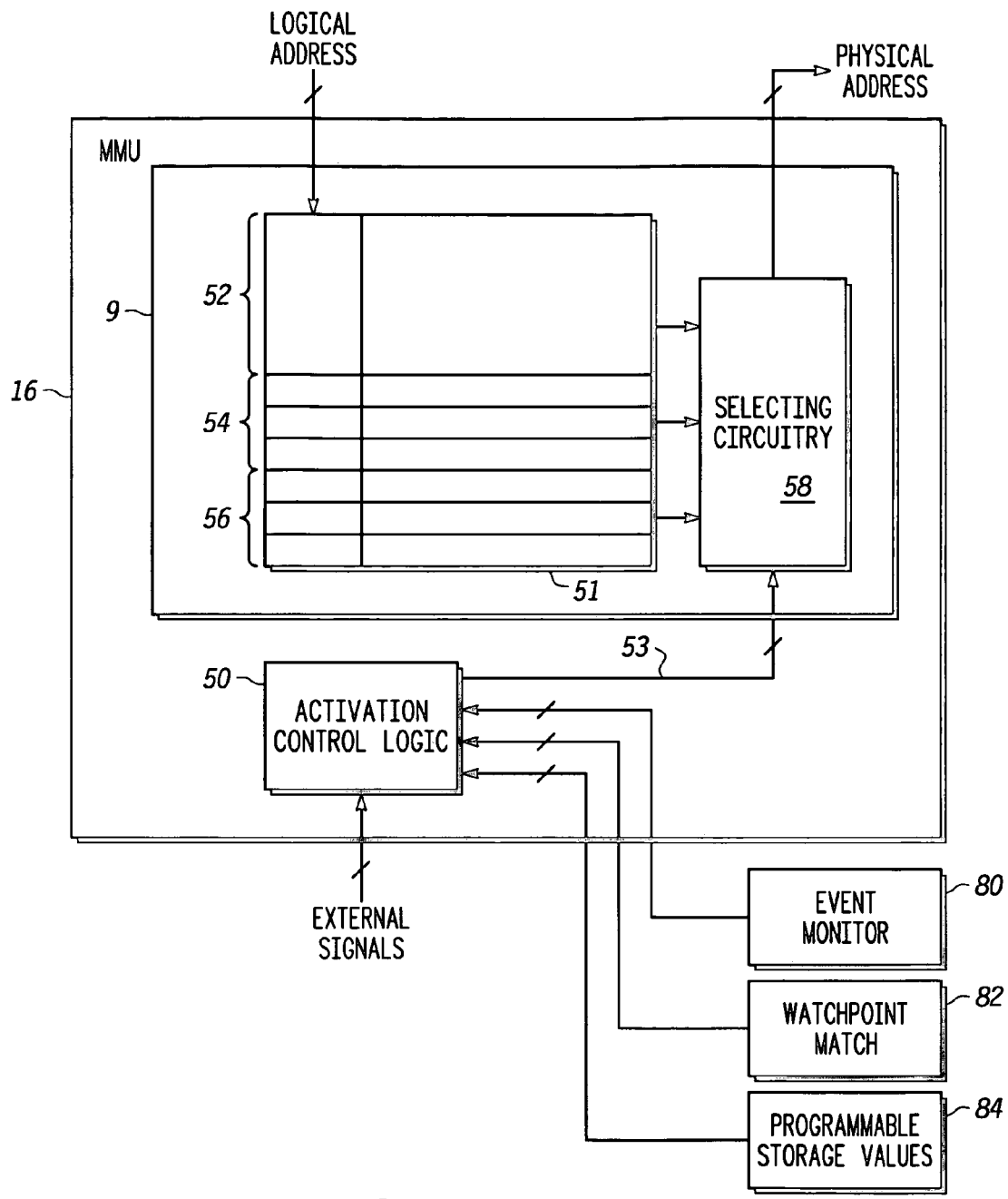
FIG. 2 illustrates a block diagram of one form of the memory management unit and a portion of other functional circuitry of FIG. 1.

Illustrated in FIG. 2 is a block diagram of one form of the memory management unit 16 of FIG. 1. In a general form the memory management unit 16 has the address translation table 9 and activation control logic 50. The address translation table 9 has a plurality of entries 51 and selecting circuitry 58. Logical addresses are input into the memory management unit 16 and physical addresses are output in response to a match existing within the address translation table 9. In general, the memory management unit 16 functions to compare a received logical address with stored entries in the address translation table 9 and determine whether a match or hit exists so that a physical address can be provided. Because this operation of the memory management unit 16 is conventional and well known in the literature, details of the circuitry which implement this function are not provided in FIG. 2. The entries 51 are illustrated as being divided into three groups or portions. A portion of entries 52 that are unconditionally activated in response to a received matching address is formed of any desired number of entries. An output of the unconditionally activated portion of entries 52 is coupled to a first input of selecting circuitry 58. A portion of entries 54 capable of being activated has an output connected to a second input of the selecting circuitry 58. A portion of entries 56 capable of being activated has an output connected to a third input of the selecting circuitry 58. It should be understood that the total number of entries of each of unconditionally activated entries 52, entries 54 capable of being activated and entries 56 capable of being activated is arbitrary. An activation control logic circuit 50 has a first input for receiving external signals. Programmable storage values 84 are output to a second input of the activation control logic circuit 50. Watchpoint match values 82 are output to a third input of the activation control logic circuit 50. An output of an event monitor 80 is coupled to a fourth input of the activation control logic circuit 50 for providing event signals in response to predetermined events. A control signal 53 is provided by the activation control logic circuit 50 that has an output coupled to a fourth input of the selecting circuitry 58.

In operation, a logical address is coupled to the address translation table 9 and a comparison is made with a predetermined field or portion of each entry in the address translation table 9 in search of a match. If a match is detected with an entry existing in the unconditionally activated entries 52, a corresponding physical address from this portion is provided to the selecting circuitry 58. Selecting circuitry 58 functions to output any physical address provided by the unconditionally activated entries 52 regardless of the value of control signal 53. Thus, the physical addresses from entries 52 are provided in an unconditional manner when a matching logical address is received.

Figure 3:
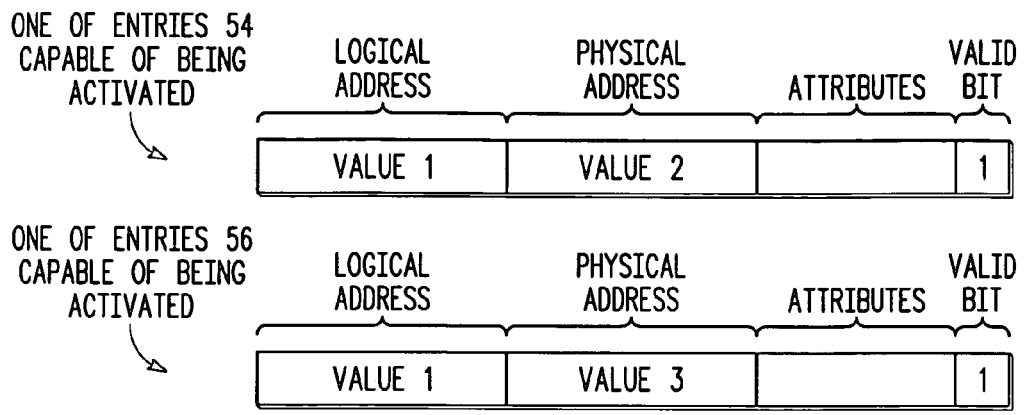
FIG. 3 illustrates in diagrammatic form an example of two entries of the address translation table of FIG. 1.

Reference to FIG. 3 will further assist with the understanding of operation of the provision of physical addresses in a conditional manner. An example of one of the entries 54 that is capable of being activated and one of the entries 56 that is capable of being activated is provided in FIG. 3. In each table entry there is a field that holds a value corresponding to a received logical address. A second field holds a corresponding (i.e. the translated) physical address. A third field contains conventional attributes, such as write enable bits, etc. A fourth field contains a valid bit. In this example when the valid bit assumes a logic one value, the entry is valid. If the entry is not valid logic circuitry within the address translation table 9 prevents an output from being provided by the memory management unit 16 from that entry. It should be noted that in the FIG. 3 example there is a same value, Value 1, present in the Logical Address field for two lines which are both valid. For conventional processors the existence of two valid lines having the same address would be a system programming violation and would not be permitted. Additionally, note although both valid entries in FIG. 3 have a same logical address value, each entry translates to a different physical address. The entry in the entries 54 translates to a physical address having a value of Value 2. The entry in the entries 54 translates to a physical address having a value of Value 3. Thus a dynamic memory remapping operation may be implemented by selecting between one of these two entries which are each addressed by the Value 1 logical address. The selection between the two entries dynamically occurs in response to the value of control signal 53. Control signal 53 may be of any bit size and thus can be encoded to have any number of values and thus select between however many groups of activated entries in the address translation table 9 that are desired. In the example of FIG. 3, when control signal 53 assumes a first predetermined value, the selecting circuitry 58 will select any matching entry or "hit" that occurs within the entries 54 that are capable of being activated. In response to a match of a received logical address having Value 1 and the control signal 53 activating entries 54, the memory management unit 16 provides a physical address of Value 2. When control signal 53 assumes a second predetermined value the selecting circuitry 58 will select any matching entry or hit that occurs within the entries 56 that are capable of being activated. Therefore, the value of Value 3 is provided as the physical address. Thus a dynamic memory mapping between two physical addresses is implemented based upon predetermined values of the control signal 53. As stated above, the entries 52 are not controlled by the value of control signal 53, and selecting circuitry 58 passes the physical address of these entries when the received logical address matches the stored logical address value of any of those entries.

Control signal 53 may be provided in response to a number of external events and influences. For example, external signals from integrated circuit pin 21 having an active state or value will cause the activation control logic 50 to enable or provide the control signal 53. Enablement of the control signal 53 of the activation control logic 50 may also be conditioned on other criteria or stimuli such as the occurrence of predetermined events by event monitor 80 or the occurrence of system code watchpoints as indicated by the watchpoint match values 82. Additionally, programmable storage values 84 may be established so that predetermined values must be received by the activation control logic 50 to enable or modify the enablement of the value of control signal 53. In one embodiment, activation control logic 50 may include a debug port and debug control logic. In one embodiment, a JTAG (Joint Test Action Group) TAP (Test Access Port) interface or NEXUS (the widely used IEEE standard for debug of processors and digital system architectures) debug port may be included with the activation control logic 50 which implements a debug control function. In one embodiment, one or more debug control functions may be used to provide a value that will cause the activation control logic 50 to enable or provide the control signal 53 rather than using external signal values directly.

It should be understood that the activation control logic 50 may also provide a processor synchronization control signal (not shown) in response to receiving an input signal, regardless of which source of origin discussed above. The processor synchronization control signal is used by processor 12 for guaranteeing correct memory accessibility of any of memory 18, memory 19 or memory 34 of FIG. 1. In other words, the access is coordinated to ensure that all memory accesses in progress are completed before any new memory address space is selected. Additional instruction synchronization of the processor 12 may be applied to flush instruction prefetch buffers if implemented. In some embodiments, additional synchronization operations involving other logic within data processing system 10 may be provided by activation control logic 50.

Figure 4:
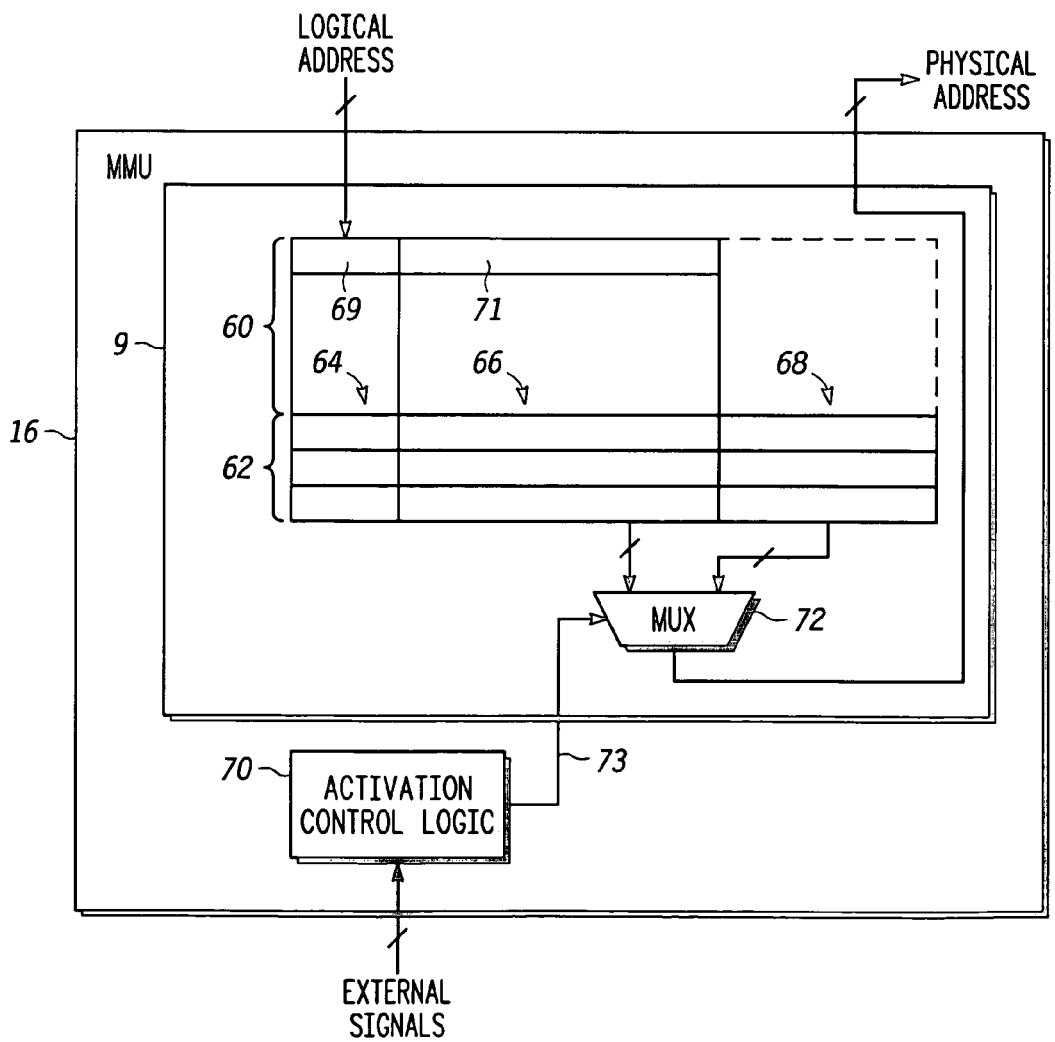
FIG. 4 illustrates a block diagram of another form of the memory management unit of FIG. 1.

Illustrated in FIG. 4 is another embodiment wherein the data entry storage structure of address translation table 9 is modified. For purposes of comparison between the embodiments of FIG. 2 and FIG. 4 the same reference numbers will be used in connection with common elements. In FIG. 4 memory management unit 16 has an activation control logic circuit 70 that receives the external signals from integrated circuit pin 21. It should be well understood that additional inputs may be connected to the activation control logic circuit 70 such as an event monitor, watchpoint match circuitry and programmable storage values as was illustrated in connection with the first embodiment. Such additional inputs have not been illustrated solely for purposes of brevity. Activation control logic circuit 70 provides a control signal 73 to a control input of a multiplexer (Mux) 72. The control signal 73 may be a single bit signal or in other forms may be multiple bits. Multiplexer 72 has a first input connected to a first output of the address translation table 9. Multiplexer 72 also has a second input connected to a second output of the address translation table 9. The table of address translation table 9 has an input for receiving a logical address, a portion of entries 60 and a portion of entries 62. One of the entries within entries 60 has a logical address 69 and an associated physical address 71. It should be understood that additional fields containing one or more validity bits and attributes is typically present in each of the entries within the address translation table 9. Each of the entries 62 has a logical address field 64, a corresponding first physical address field 66 and a corresponding second physical address field 68. An output of multiplexer 72 provides a physical address.

In operation a logical address is received and conventional circuitry (not shown) within the memory management unit 16 determines if a match with any of the stored logical addresses within entries 60 and entries 62 exists. For example, a comparator (not shown) is used to compare the received logical address with each of the stored logical addresses to determine if a hit or match occurs. If a match occurs within any of the entries that form entries 60, the multiplexer 72 receives the corresponding physical address, such as physical address 71, and outputs the physical address. In contrast, if a match occurs within any of the entries that form entries 62, the multiplexer 72 receives two corresponding physical addresses, one from the physical address field 66 and the other from the physical address field 68. The control signal 73 functions to select only one of the physical addresses based upon the value of the external signals received from outside of the integrated circuit 11. As mentioned above, it should be understood that additional signals, such as a watchpoint, a breakpoint or an event may further condition the value assumed by control signal 73. The value of control signal 73 enables multiplexer 72 to output only one of the two received physical addresses. As a result, a dynamic memory remapping is accomplished wherein only one of two physical addresses associated with the same valid logical address is provided. The decision as to which physical address to select may depend upon system operating context. The dynamic altering of the memory mapping is non-intrusive to the processor 12 and does not result in instruction execution halting or delay.

By now it should be apparent that there has been provided a processor having dynamic altering of address translation maps without being intrusive to the processing operation. A section of the address translation table, often referred to as a translation look-aside buffer (TLB), is dedicated for remapping purposes. A predetermined number of entries in the address translation table have two physical addresses which are bank-switched as the desired physical address output to alter the address translation mapping. Because the control of the address translation mapping is performed with hardware and in response to external signals, the mapping results in a non-intrusive method as compared with software based remapping and the associated processing that is required.

In one form there is herein provided a processor having an address translation table and a method for translating a logical address into a physical address. A logical address is provided to the address translation table. A control signal is provided such that when the control signal has a first value, a first physical address is provided from the address translation table corresponding to the logical address. When the control signal has a second value, a second physical address is provided from the address translation table. The second physical address is different from the first physical address and also corresponds to the logical address. The first physical address and the second physical address are stored in at least one valid entry of the address translation table. In one form the first physical address is stored in a first valid entry of the address translation table, and the first valid entry has a tag field which matches the logical address and has a valid field indicating the first valid entry is valid. In another form the second physical address is stored in a second valid entry of the address translation table. The second valid entry has a tag field which matches the logical address and a valid field indicating the second valid entry is valid. In one form the first physical address is stored in a first field of the first valid entry and the second physical entry is stored in a second field of the first valid entry of the address translation table. The control signal is provided to select one of the first field or the second field of the first valid entry based on a value of the control signal. In another form the address translation table has a first portion that stores the first physical address and a second portion that stores the second physical address. The control signal is provided to activate one of the first portion or the second portion based on a value of the control signal. In another form the address translation table has a first portion for storing the first physical address and a second portion for storing the second physical address. The control signal is provided to select one of an output of the first portion or an output of the second portion based on a value of the control signal. In another form the control signal is provided based on at least one external signal generated outside the processor. In yet another form the control signal is provided in response to a program counter of the processor matching a predetermined value. In yet another form the control signal is provided in response to a predetermined system event.

In an alternate form there is provided a processor having an address translation table and a method for translating a logical address into a physical address. A logical address is provided to the address translation table. The address translation table includes a first entry having a tag field which matches the logical address, a physical address field storing a first physical address, and a valid field indicating that the first entry is valid. The address translation table includes a second entry having a tag field which matches the logical address, a physical address field storing a second physical address, different from the first physical address, and a valid field indicating that the second entry is valid. A control signal is provided. When the control signal has a first value, the first physical address is provided. When the control signal has a second value, a second physical address is provided. In one form the address translation table has a first portion for storing the first physical address and a second portion for storing the second physical address. The control signal is provided to activate one of the first portion or the second portion based on a value of the control signal. In another form the address translation table has a first portion for storing the first physical address and a second portion for storing the second physical address. The control signal is provided to select one of an output of the first portion or an output of the second portion based on a value of the control signal. In another form the control signal is provided in response to at least one of: (1) an external signal generated outside the processor; (2) a program counter of the processor matching a predetermined value; and/or (3) a predetermined system event.

In yet another form there is provided a processor having an address translation table storing a first physical address corresponding to a logical address and a second physical address corresponding to the logical address. The first and second physical addresses are stored in at least one valid entry of the address translation table. Control circuitry is coupled to the address translation table. The control circuitry provided a control signal. The address translation table provides the first physical address when the control signal has a first value and provides the second physical address when the control signal has a second value. In one form the first physical address is stored in a first valid entry of the address translation table, the first valid entry has a tag field storing the logical address, and a valid field indicates that the first valid entry is valid. In another form the second physical address is stored in a second valid entry of the address translation table, the second valid entry has a tag field for storing the logical address and has a valid field for indicating that the second valid entry is valid. In another form the first physical address is stored in a first field of the first valid entry and the second physical address is stored in a second field of the first valid entry. Each of the first and second physical addresses corresponds to the tag field of the first valid entry. In yet another form the address translation table has a second valid entry. The second valid entry has a tag field and physically stores a single physical address corresponding to the tag field. In another form the control circuitry is responsive to at least one external signal generated outside the processor. In yet another form the control circuitry is responsive to a match indicator provided when a program counter of the processor matches a predetermined value. In another form the control circuitry is responsive to a predetermined system event.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

What is claimed is:

1. A method for translating a logical address into a physical address comprising:
   providing a processor having an address translation table;
   providing a logical address to the address translation table;
   providing a control signal in response to at least one of: (1) a predetermined system event, (2) a program counter of the processor matching a predetermined value or (3) at least one signal generated outside the processor;
   when the control signal has a first value, providing a first physical address from the address translation table corresponding to the logical address; and
   when the control signal has a second value, providing a second physical address from the address translation table, different from the first physical address, corresponding to the logical address, wherein the first physical address and the second physical address are stored in at least one valid entry of the address translation table.

2. The method of claim 1, wherein the first physical address is stored in a first valid entry of the address translation table, the first valid entry having a tag field which matches the logical address and a valid field indicating the first valid entry is valid.

3. The method of claim 2, wherein the second physical address is stored in a second valid entry of the address translation table, the second valid entry having a tag field which matches the logical address and a valid field indicating the second valid entry is valid.

4. The method of claim 2, wherein the first physical address is stored in a first field of the first valid entry and the second physical address is stored in a second field of the first valid entry of the address translation table, and wherein providing the control signal comprises:
providing the control signal to select one of the first field or the second field of the first valid entry based on a value of the control signal.

5. The method of claim 1, wherein the address translation table has a first portion storing the first physical address and a second portion storing the second physical address, and wherein providing the control signal comprises:
providing the control signal to activate one of the first portion or the second portion based on a value of the control signal.

6. The method of claim 1, wherein the address translation table has a first portion storing the first physical address and a second portion storing the second physical address, and wherein providing the control signal comprises:
providing the control signal to select one of an output of the first portion or an output of the second portion based on a value of the control signal.

7. A method for translating a logical address into a physical address comprising:
providing a processor having an address translation table;
providing a logical address to the address translation table, wherein the address translation table includes:
a first entry having a tag field which matches the logical address, a physical address field storing a first physical address, and a valid field indicating that the first entry is valid, and
a second entry having a tag field which matches the logical address, a physical address field storing a second physical address, different from the first physical address, and a valid field indicating that the second entry is valid;
providing a control signal;
when the control signal has a first value, providing the first physical address; and
when the control signal has a second value, providing a second physical address.

8. The method of claim 7, wherein the address translation table has a first portion storing the first physical address and a second portion storing the second physical address, and wherein providing the control signal comprises:
providing the control signal to activate one of the first portion or the second portion based on a value of the control signal.

9. The method of claim 7, wherein the address translation table has a first portion storing the first physical address and a second portion storing the second physical address, and wherein providing the control signal comprises:
providing the control signal to select one of an output of the first portion or an output of the second portion based on a value of the control signal.

10. The method of claim 7, wherein providing the control signal comprises:
providing the control signal in response to at least one selected from a group consisting of:
an external signal generated outside the processor,
a program counter of the processor matching a predetermined value, and
a predetermined system event.

11. A processor, comprising:
an address translation table having an input for receiving a logical address, a first entry comprising a tag field for storing a tag value which matches the logical address, a first physical address field for storing a first physical address and a valid field for indicating that the first entry is valid, and a second entry comprising a tag field for storing the tag value which matches the logical address, a second physical address field for storing a second physical address that is different from the first physical address and a valid field indicating the second entry is valid; and
control circuitry coupled to the address translation table, the control circuitry providing a control signal, the address translation table providing the first physical address when the control signal has a first value and providing the second physical address when the control signal has a second value.

12. The processor of claim 11, wherein the first physical address is stored in a first field of the first valid entry and the second physical address is stored in a second field of the first valid entry, each of the first and second physical addresses corresponding to the tag field of the first valid entry.

13. The processor of claim 12, wherein the address translation table has a second valid entry, the second valid entry having a tag field and physically storing a single physical address corresponding to the tag field.

14. The processor of claim 11, wherein the control circuitry is responsive to at least one external signal generated outside the processor.

15. The processor of claim 11, wherein the control circuitry is responsive to a match indicator provided when a program counter of the processor matches a predetermined value.

16. The processor of claim 11, wherein the control circuitry is responsive to a predetermined system event.

* * * * *